United States Patent Office 3,567,757
Patented Mar. 2, 1971

3,567,757
PROCESS FOR PREPARING OMEGA-AMINOALKANENITRILES
Kenzaburo Ida, 19, 2-chome, Matsuzono-cho, Mizuho-ku; Seiya Suzuki, 8 Denjiyama, Narumi-cho, Midori-ku; Yasuo Iizuka, 64, 1-chome, Shijo-cho, Minami-ku; Tsutomu Setsuda, 64, 1-chome, Shijo-cho, Minami-ku; and Shin-ichi Taira, 31 Yakushiyama, Narumi-cho, Midori-ku, all of Nagoya, Japan
No Drawing. Filed Feb. 2, 1968, Ser. No. 702,523
Int. Cl. C07c 121/02
U.S. Cl. 260—465.2             4 Claims

ABSTRACT OF THE DISCLOSURE

Process for preparing omega-aminoalkanenitriles which comprises dehydrating the corresponding lactams in the presence of an excess of ammonia in the vapor phase with the aid of a dehydrating catalyst obtained by calcining at 300–550° C. a metal salt of phosphoric acid, in which a metal is selected from the group consisting of magnesium, calcium, barium, zinc, cadmium and aluminum.

---

This invention relates to the preparation of omega-aminoalkanenitriles by dehydration of the corresponding lactams, in good yields and advantageously in commercial scale, while restraining so far as possible the occurrence of side reactions.

A number of processes for obtaining omega-aminoalkanenitriles by treating lactams with ammonia in the presence of a suitable dehydration catalyst have been known in the past. Of these processes, those of importance are as follows:

(A) Passing gaseous epsilon-caprolactam together with an excess of ammonia over a copper-silica gel dehydration catalyst at a temperature of 360° C. to obtain epsilon-aminocapronitrile. The yield of epsilon-aminocapronitrile is only 25% (U.S. Pat. 2,234,566).

(B) Dehydrating epsilon-caprolactam in the presence of an excess of ammonia at a temperature of 360° C., using a copper-alumina catalyst. The yield of epsilon-aminocapronitrile is approximately 50% based on the epsilon-caprolactam employed (Dutch Pat. 69,907).

(C) Contacting gaseous epsilon-caprolactam, in the co-presence of an excess of ammonia, with a dehydration catalyst consisting of alumina and/or kaolin, at 250–400° C., to obtain epsilon-aminocapronitrile. In this case, the conversion rate of epsilon-caprolactam was 53.2–66.3% and the converted product contained 96–97% by weight of epsilon-aminocapronitrile (Japanese patent application Publication No. 10,790/1958).

In these known processes there was such a disadvantage that either the yield of the intended omega-aminoalkanenitrile was exceedingly low or the formation of such by-products as, say, 5-hexenenitrile and 4-hexenenitrile was large in those cases where the yields were relatively high.

It is the object of the present invention to provide an improved process for the dehydration of lactams to omega-aminoalkanenitriles wherein the disadvantages hereinbefore enumerated are substantially eliminated. We have found that magnesium, calcium, barium, zinc, cadmium or aluminum salt of phosphoric acid, when calcined, is very effective for the object.

Accordingly, this invention is directed to a process for preparing omega-aminoalkanenitrile which comprises passing a lactam together with an excess of ammonia in the vapor phase over a dehydration catalyst obtained by calcining at a temperature of 300–550° C. a metal salt of phosphoric acid, in which a metal is selected from the group consisting of magnesium, calcium, barium, zinc, cadmium and aluminum, to form the corresponding omega-aminoalkanenitrile.

The term "phosphoric acid," as herein used, is a generic term of orthophosphoric, metaphosphoric and pyrophosphoric acids. The excellent catalytic activities are demonstrated by the salts of these phosphoric acids, regardless of whether they are neutral salts or acid salts.

In calcining the phosphoric acid salts, this may be performed after simply molding the salts, but it is usually preferred that the salts are blended with a small amount of molding binder such, for example, as graphite, aluminum stearate, etc., molded into a suitable size and then calcined in the usual manner.

The calcinations are carried out by the conventional ways. Preferred example is that of passing the gas of an elevated temperature obtained by burning a combustible gas over catalyst. The vapor formed during the calcination is preferable to be forcedly driven out from the system.

Ammonia should be used in excess of the equivalent of lactam. Usually good results have been obtained by using at least 5 moles of ammonia, and particularly 10–50 moles, for every mole of the lactam. This is because a decrease in the yield of omega-aminoalkanenitrile and an increase in the formation of such by-products as alkanenitriles take place as the amount of ammonia becomes smaller. On the other hand, the use of ammonia in excessively large amounts is undesirable from the economical reason.

Although the invention is applicable to any lactams, those containing 4–12 carbon atoms are especially used with convenience. Specific examples of conveniently usable are gamma-butyrolactam, delta-valerolactam, epsilon-caprolactam, zeta-enantholactam, eta-caprylolactam and lambda-laurolactam.

In this invention, the time during which the reactants and the catalyst are in contact is suitably 0.1 to 10 seconds, and particularly 3 to 8 seconds. In any particular case, an increase in the contact time beyond a certain point, while giving a greater conversion of lactam, nevertheless involves an undesirable increase in the formation of by-products. If the contact time is too short, the conversion rate decreases unpractically.

In this invention, the dehydration is suitably carried out at 270–450° C., but for maintaining a high rate of conversion and raising the yield of omega-aminoalkanenitrile, a temperature of 330–380° C. is particularly to be preferred. Generally speaking, at a temperature below 250° C., there is insufficient dehydration, while above 450° C., the formation of undesired by-products becomes predominant.

The catalyst to be used in this invention, as hereinbefore noted, is a magnesium, calcium, barium, zinc, cadmium or aluminum salt of phosphoric acid, which has been calcined at 300–550° C. This catalyst is superior in its conversion rate, yield of omega-aminoalkanenitrile and durability to the conventional ones used in the prior art processes. In addition, it has the advantage that its activity is hardly affected by the purity of the lactams to be used. The activity of the catalyst varies considerably depending upon whether or not it has been calcined. And also the temperature of calcination is very important.

Whether or not it has been calcined and the calcination temperature hardly affect the yield, but the conversion rate is greatly affected. Namely, the conversion rate of about 40 to 70% is usually attained with the catalyst calcined at 300–550° C., whereas it drops to below 40% with the catalyst calcined at below 300° C. or above 600° C. In some cases the rate can reach above 90%.

The foregoing fact will be explained by the following series of comparative experiments.

Example 1 of a Series of Comparative Experiments

Magnesium, calcium, barium, aluminum or zinc salt of phosphoric acid, blended with graphite (4% of the salt by weight), was molded into tablets of 5 mm. in diameter and length. The tablets were charged to a calcination oven, and the temperature of the catalyst layer was maintained at the prescribed temperture for 4 hours by passing a combustion gas obtained by the perfect combustion of natural gas. A tube 3.8 cm. in diameter and 55 cm. in length was packed with the obtained catalyst. Then a vapor mixture consisting of epsiloncaprolactam and ammonia in a ratio of 10-20 moles of ammonia for every mole of lactam was continuously passed through the tube at the prescribed temperature and contact time.

The vapor issuing from the tube were cooled to below 20° C. to condense the liquid reaction mixture and separate it from the gas. After removal of water from the reaction mixture, it was analyzed, and the yield of epsilon-aminocapronitrile and the conversion rate of epsilon-caprolactam to epsilon-aminocapronitrile were calculated.

$$\text{Conversion rate} = \frac{\text{moles of aminonitrile formed}}{\text{moles of lactam fed}} \times 100$$

$$\text{Yield} = \frac{\text{moles of aminonitrile formed}}{\text{moles of lactam converted}} \times 100$$

On the other hand, the conversion rate and yield are calculated from the numerical values given in the examples of the pertinent patents using alumina and kaolin as a catalyst and are presented in Table I, below, together with the results obtained hereinabove.

It is apparent that the invention process surpasses the prior art process in either its yield or conversion rate.

Example 2 of a Series of Comparative Experiments

The relationship between the calcination temperature of the catalyst and its activity was investigated.

The tablets of magnesium hydrogen phosphate $$(MgHPO_4 \cdot 3H_2O),$$

molded in the same manner as described in Example 1 of this series, were charged to a calcination oven and calcined for 4 hours by passing a combustion gas therethrough. The vapor resulting from the elimination of the water of crystallization and intermolecular dehydration was cooled and removed. The calcinations were carried out at various temperatures. The obtained catalysts were used to determine the catalytic activities with the same apparatus and in the same reaction procedure as described in Example 1 of this series. The reaction conditions were as follows:

Lactam: epsilon-caprolactam
Ammonia/lactam mole ratio: 25
Reaction temperature: 350° C.
Contact time: 3 seconds The results obtained are shown in Table II.

TABLE II

| Calcination temperature of catalyst, °C. | Conversion rate of epsilon-caprolactam, percent | Yield of epsilon-amino capronitrile, percent |
| --- | --- | --- |
| Not calcined | 15 | 98 |
| 150 | 20 | 98 |
| 250 | 28.5 | 98 |
| 300 | 45 | 98.5 |
| 350 | 59 | 98.5 |
| 400 | 68.5 | 98.5 |
| 450 | 70 | 98.5 |
| 500 | 69.5 | 98.5 |
| 550 | 58 | 98.5 |
| 600 | 27 | 97 |
| 700 | 20 | 90.5 |

As the calcination temperature became higher, the rate of conversion was enhanced. The activity increased sharply when the calcination temperature was over 300° C. and it became practically constant at between 400° and 500° C. (conversion rate: 68.5–70%). However, it declined above 550° C. Although yields of epsilon-amino capronitrile did not fluctuate so much, the conversion rate reached a maximum when the catalyst was calcined at a temperature between 300 and 500° C.

Example 3 of a Series of Comparative Experiments

Calcium phosphate ($Ca_3(PO_4)_2$) blended with 5% of graphite by weight was molded into tablets of 5 mm. in diameter and 3 mm. thick. Following the procedure described in Example 2 of this series, the relationship between calcination temperature and catalytic activity was examined. The conditions were as follows:

Calcination time: 6 hours
Lactam: epsilon-caprolactam
Ammonia/lactam mole ratio: 20
Reaction temperature: 360° C.
Contact time: 2 seconds As in the case of Example 2, the conversion rates increased as the calcination temperature rose. The activity increased noticeably when calcination was operated at above 300° C. (conversion rate: 50%) and it reached to maximum at between 400–500° C. (conversion rate: 71–73%). However, it decreased abruptly atabove 550° C.

Example 4 of a Series of Comparative Experiments

Aluminum metaphosphate ($Al(PO_3)_3$), barium pyrophosphate ($Ba_2P_2O_7$) and zinc phosphate $$(Zn_3(PO_4)_2 \cdot 4H_2O)$$

were blended respectively with 3% of aluminum stearate by weight, and the mixtures were molded into tablets of

TABLE I

| General term of catalyst formed after calcination | Starting material | Calcination temp., °C. | Reaction temp., °C. | Contact time. sec. | Mole ratio $NH_3$/lactam | Conversion rate percent | Yield, percent |
| --- | --- | --- | --- | --- | --- | --- | --- |
| Magnesium phosphate | Magnesium hydrogen phosphate $MgHPO_4 \cdot 3H_2O$ | 400 | 340 | ½ | 20 | 66.0 | 99 |
| | | | 360 | 7 | 12 | 69.5 | 98 |
| Calcium phosphate | Calcium metaphosphate $Ca(PO_3)_2$ | 420 | 340 | ½ | 20 | 67.5 | 99.5 |
| | | | 360 | 7 | 12 | 71.5 | 98.5 |
| Aluminum phosphate | Aluminum pyrophosphate $Al_4(P_2O_7)_3$ | 450 | 340 | ½ | 20 | 66.5 | 99 |
| | | | 360 | 7 | 12 | 70.5 | 98 |
| Zinc phosphate | Zinc phosphate $Zn_3(PO_4)_2 \cdot 4H_2O$ | 500 | 340 | ½ | 20 | 61.5 | 98.5 |
| | | | 360 | 7 | 12 | 66.0 | 98 |
| Barium phosphate | Barium pyrophosphate $Ba_2P_2O_7$ | 450 | 340 | ½ | 20 | 60.8 | 98.5 |
| | | | 360 | 7 | 12 | 65.0 | 98 |
| Alumina [1] | | | 340 | ½ | 20 | 54.2 | 99 |
| Kaolin [2] | | | 360 | 7 | 12 | 63.7 | 96 |

[1] Japanese patent application Publication No. 13066/1961 (Example 2).
[2] Japanese patent application Publication No. 10790/1958 (Example 1).

5 mm. in diameter and length. The relationship between the calcination temperature and catalytic activity was examined as in Example 3 under identical conditions as used therein. The results are presented collectively in Table III.

TABLE III

| Calcination temperature, °C. | Catalyst | | |
|---|---|---|---|
| | Aluminum phosphate | Barium phosphate | Zinc posphate |
| | Activity, conversion rate, percent | | |
| Uncalcined | 13.5 | 12 | 10 |
| 250 | 25 | 20 | 19 |
| 300 | 45 | 40 | 38 |
| 350 | 57.4 | 53.4 | 53 |
| 400 | 67.5 | 65 | 64 |
| 450 | 70 | 67 | 65.8 |
| 500 | 68.9 | 66 | 65 |
| 550 | 51.2 | 46 | 42 |
| 600 | 28 | 23 | 23 |

The results demonstrated that there were pronounced differences in activities depending upon the calcination temperature, as shown in the cases of Examples 2 and 3.

It was thus found from the results of the foregoing Comparative Experiments that the temperature of 300–550° C. was suitable for the calcination of the catalysts.

The following nonlimitative examples are given to illustrate the invention.

EXAMPLE 1

A tube 3.8 cm. in diameter and 55 cm. in length was packed with calcium phosphate catalyst calcined at 400° C. as shown in Example 3 of Comparative Experiments. A vapor mixture of epsilon-caprolactam and ammonia in a ratio of 25 moles of ammonia for every mole of lactam was passed continuously therethrough at a temperature of 325–330° C. and a contact time of 6 seconds.

The conversion rate was 68%, and the yield of epsilon-aminocapronitrile was 98%.

EXAMPLE 2

A mixture of cadmium phosphate ($Cd_3(PO_4)_2$) and graphite (4% by weight) was molded into tablets of 5 mm. in diameter and length, followed by calcining at 350° C. for 4 hours and packing in the same tube as used in Example 1. A vapor mixture of epsilon-caprolactam and ammonia in a mole ratio of 1:25 was passed therethrough at a temperature of 340–355° C. and a contact time of 9 seconds. The conversion rate was 56% and the yield of epsilon-aminocapronitrile was 88%.

EXAMPLE 3

To a mixture of 600 grams of calcium pyrophosphate ($Ca_2P_2O_7$) and 400 grams of barium phosphate $$Ba_3(PO_4)_2$$

was added aluminum stearate (4% by weight), following which the mixture was molded into tablets of 5 mm. in diameter and length. These tablets were calcined for 5 hours at 420° C. and then packed in the same tube as used in Example 1. The reaction was carried out under the conditions of a contact time of 1.4 seconds, an ammonia/epsilon-caprolactam mole ratio of 15 and a temperature of 340° C. The conversion rate was 65% and the yield of epsilon-aminocapronitrile was 98%.

EXAMPLE 4

To a mixture of 500 grams of barium phosphate ($Ba_3(PO_4)_2$) and 500 grams of zinc phosphate $$Zn_3(PO_4)_2 \cdot 4H_2O$$

was added aluminum stearate (5% by weight), following which the mixture was molded into tablets of 5 mm. in diameter and 3 mm. thick. After calcining these tablets for 2 hours at 500° C., they were packed in the same tube as used in Example 1.

The reaction conditions were as follows: contact time 3 seconds, ammonia/spsilon-caprolactam mole ratio 20, and temperature 330° C.

The conversion rate was 64% and the yield of epsilon-aminocapronitrile was 99%.

EXAMPLE 5

Calcium phosphate catalyst prepared in Example 1 of Comparative Experiments was packed in a tube 1.5 cm. in diameter and 30 cm. in length, following which a vapor mixture of laurolactam and ammonia in a mole ratio of 1:40 was passed continuously therethrough while maintaining a temperature of 360° C. The contact time was 2 seconds. The liquid reaction product obtained by cooling the reaction gas to below 20° C. was analyzed after removal of water contained. Unreacted lactam was hardly detected and it was found that the principal reaction product was lambda-aminolauronitrile, a new compound.

Anal.: as $C_{12}H_{24}N_2$
Calculated: C, 73.41%; H, 12.32%; N, 14.27%
Found: C, 73.30%; H, 12.25%; N, 14.22%
Molecular weight—
  Calculated: 196.338
  Found: 196 (mass spectrum analysis)
IR spectrum: 2270 cm.$^{-1}$ characteristic absorption of nitrile group
Anal. of benzoyl derivative (M.P. 86.5–86.8° C.): as $C_6H_5CONH(CH_2)_{11}CN$
Calculated: C, 75.95%; H, 9.39%; N, 9.33
Found: C, 75.86%; H, 9.46%; N, 9.25%
Hydrogenated product: The various properties were in agreement with those of dodecamethylene diamine From the foregoing results, the principal product was identified as being a new compound omega-aminolauronitrile, $NH_2(CH_2)_{11}CN$.

The conversion rate of laurolactam was 99% and the yield of lambda-aminolauronitrile was 99.5%.

EXAMPLE 6

A vapor mixture of laurolactam and ammonia in a mole ratio of 1:45 was passed through the same tube packed with the same catalyst as used in Example 5 at a contact time of one second and a temperature of 380° C. The conversion rate was 97% and the yield of lamba-aminolauronitrile was 97.6%.

EXAMPLE 7

A vapor mixture of laurolactam and ammonia was passed on the magnesium phosphate catalyst, prepared in Example 1 of Comparative Experiments, under identical conditions as employed in Example 5. The conversion rate was 98% and the yield of lambda-aminolauronitrile was 99%.

EXAMPLE 8

A vapor mixture of laurolactam and ammonia was passed on the aluminum phosphate catalyst, prepared in Example 1 of Comparative Experiments, under identical conditions as employed in Example 5. The conversion rate was 97.5%, while the yield of lambda-aminolauronitrile was 95%.

EXAMPLE 9

A vapor mixture of laurolactam and ammonia was passed on the barium phosphate catalyst, prepared at a calcination temperature of 400° C. in Example 4 of Comparative Experiments, under identical conditions as indicated in Example 5. The conversion rate was 90% and the yield of lambda-aminolauronitrile was 98.5%.

EXAMPLE 10

A vapor mixture of laurolactam and ammonia was passed on the zinc phosphate catalyst, prepared at a calcination temperature of 450° C. in Example 4 of Comparative Experiments, under identical conditions as employed in Example 5. The conversion rate was 94% and the yield of lambda-aminolauronitrile was 96%.

EXAMPLE 11

A vapor mixture of enantholactam and ammonia in a mole ratio of 1:45 was continuously passed through the same tube packed with the same catalyst as used in Example 5 at a temperature of 350° C. and a contact time of one second. The liquid reaction product obtained by cooling the reaction gas to below 20° C. was analyzed after removal of water contained, and it was found that the main product was zeta-aminoenanthonitrile, $$NH_2(CH_2)_6CN$$

Boiling point: 123–124° C./10 mm. Hg
Anal. of benzoyl derivative (M.P. 44.5–45.0° C.): as $C_6H_5CONH(CH_2)_6CN$
Calculated: C, 73.01%; H, 7.88%; N, 12.17%
Found: C, 73.10%; H, 8.02%; N, 12.09%

The conversion rate of enantholactam was nearly 100% and the yield of zeta-aminoenanthonitrile was 98.1%.

EXAMPLE 12

A vapor mixture of caprylolactam and ammonia in a mole ratio of 1:45 was continuously passed through the same tube packed with the same catalyst as used in Example 5 at a temperature of 350° C. and a contact time of 1.4 seconds. The liquid reaction product obtained by cooling the reaction gas to below 20° C. was analyzed after removal of water contained. The main product was identified as being eta-aminocaprylonitrile, $$NH_2(CH_2)_7CN$$

Boiling point: 143–144° C./13 mm. Hg
Anal.: as $C_8H_{16}N_2$
Calculated: C, 68.52%; H, 11.50%; N, 19.98%
Found: C, 68.63%; H, 11.58%; N, 19.91%
Molecular weight—
   Calculated: 140.23
   Found: 140 (mass spectrum analysis)

Anal. of benzoyl derivative (M.P. 73.5–74.0° C.): as $C_6H_5CONH(CH_2)_7CN$
Calculated: C, 73.73%; H, 8.25%; N, 11.47%
Found: C, 73.99%; H, 8.17%; N, 11.57%

The conversion rate of caprylolactam was nearly 100%, and the yield of eta-aminocaprylonitrile was 98.4%.

We claim:
1. A process for preparing omega-aminoalkanenitriles having from 4 to 12 carbon atoms comprising dehydrating the corresponding lactam having from 4 to 12 carbon atoms in the presence of from 5 to 50 mols of ammonia per mol of lactam at a temperature of from 270 to 450° C. in the presence of a dehydrating catalyst obtained by calcining at 300 to 550° C. a metal salt of an inorganic phosphoric acid, in which the metal is selected from the group consisting of magnesium, calcium, barium, zinc, cadmium and aluminum.

2. The process according to claim 1 wherein said lactam is epsilon-caprolactam and the resulting omega-aminoalkanenitrile is epsilon-aminocapronitrile.

3. The process according to claim 1 wherein said lactam is lambda-laurolactam and the resulting omega-aminoalkanenitrile is lambda-aminolauronitrile.

4. The process according to claim 1 wherein the time of contact with the catalyst is 0.1 to 10 seconds.

References Cited

UNITED STATES PATENTS

| | | | |
|---|---|---|---|
| 2,234,566 | 3/1941 | Lazier et al. | 260—465.5X |
| 2,375,005 | 5/1945 | Kung | 260—465.2 |
| 2,830,072 | 4/1958 | Garritsen et al. | 260—465.5 |

JOSEPH P. BRUST, Primary Examiner

U.S. Cl. X.R.

252—437; 260—465, 465.5